United States Patent
Clüsserath

(10) Patent No.: US 8,608,139 B2
(45) Date of Patent: Dec. 17, 2013

(54) METHOD AND DEVICE FOR CARBONATING A LIQUID MEDIUM, FOR EXAMPLE A BEVERAGE

(75) Inventor: Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 376 days.

(21) Appl. No.: 12/999,296

(22) PCT Filed: Jun. 24, 2009

(86) PCT No.: PCT/EP2009/004540
§ 371 (c)(1),
(2), (4) Date: Dec. 15, 2010

(87) PCT Pub. No.: WO2010/003550
PCT Pub. Date: Jan. 14, 2010

(65) Prior Publication Data
US 2011/0091623 A1    Apr. 21, 2011

(30) Foreign Application Priority Data
Jul. 10, 2008   (DE) .................... 10 2008 032 369

(51) Int. Cl.
*B01F 3/04* (2006.01)
(52) U.S. Cl.
USPC .......................... 261/118; 261/124

(58) Field of Classification Search
USPC .......................... 261/118, 121.1, 124
See application file for complete search history.

(56) References Cited

U.S. PATENT DOCUMENTS

| | | | |
|---|---|---|---|
| 3,186,644 A | 6/1965 | Ross | |
| 3,780,198 A | 12/1973 | Pahl et al. | |
| 4,068,010 A * | 1/1978 | Karr | 426/477 |
| 5,971,371 A | 10/1999 | Cheng | |
| 7,377,499 B2 | 5/2008 | Pakdaman | |
| 2004/0131514 A1 | 7/2004 | Liou | |

FOREIGN PATENT DOCUMENTS

| | | |
|---|---|---|
| DE | 2226307 | 12/1972 |
| DE | 3419153 | 11/1985 |
| DE | 41 24 728 | 10/1992 |
| DE | 91 16 615 | 4/1993 |
| DE | 10227818 | 1/2004 |
| EP | 0454864 | 11/1991 |
| EP | 1 283 069 | 2/2003 |
| FR | 2 285 172 | 4/1976 |
| GB | 2234187 | 1/1991 |
| WO | 2007/147191 | 12/2007 |

* cited by examiner

*Primary Examiner* — Robert A Hopkins
(74) *Attorney, Agent, or Firm* — Occhiuti & Rohlicek LLP

(57) ABSTRACT

A method and a device for carbonating a liquid medium, for example a beverage, by introducing $CO_2$ under pressure into the liquid medium via at least one nozzle device (5, 5a, 5b, 21) which is arranged in a housing (3, 3a-c) through which the liquid medium flows.

15 Claims, 3 Drawing Sheets

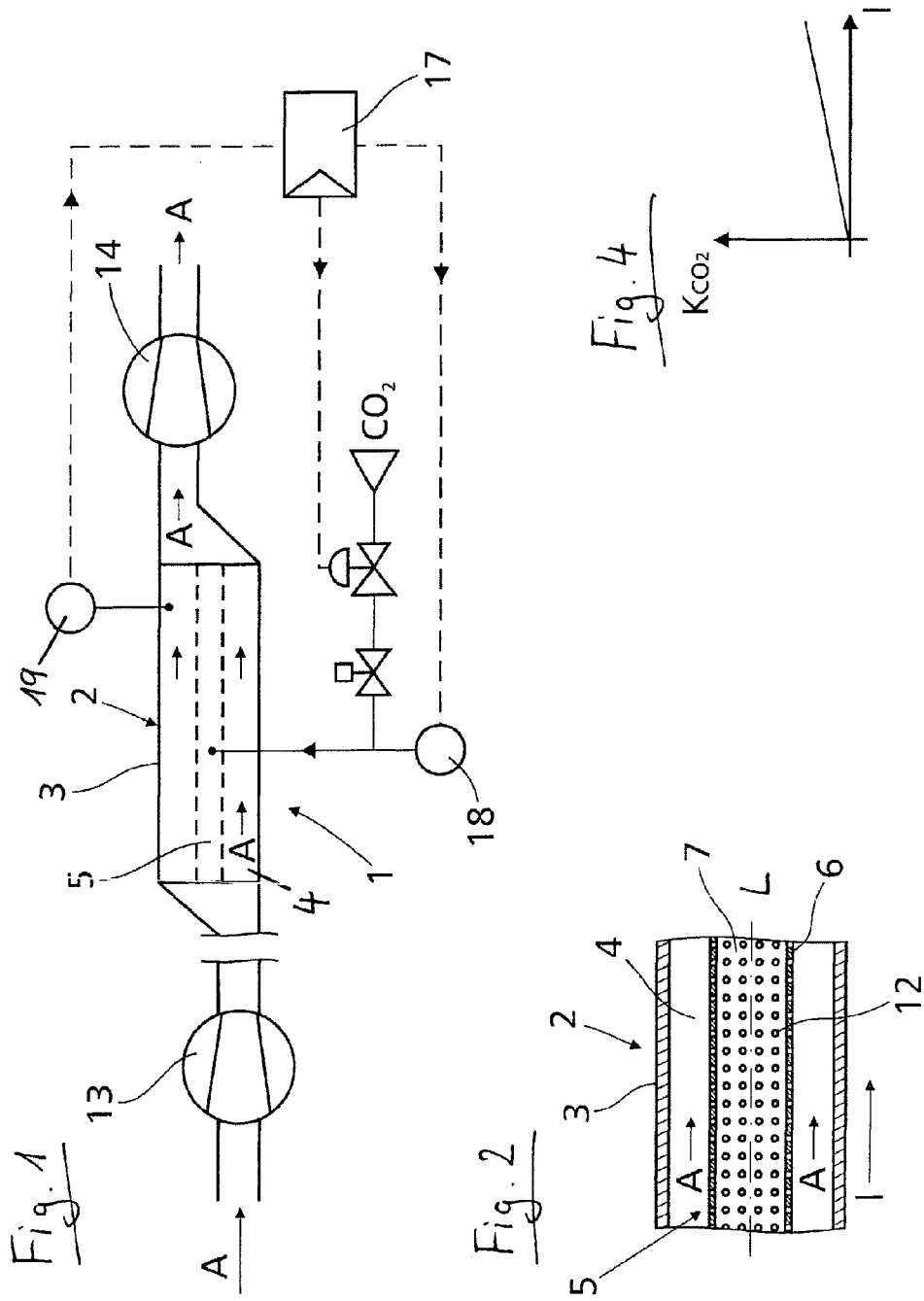

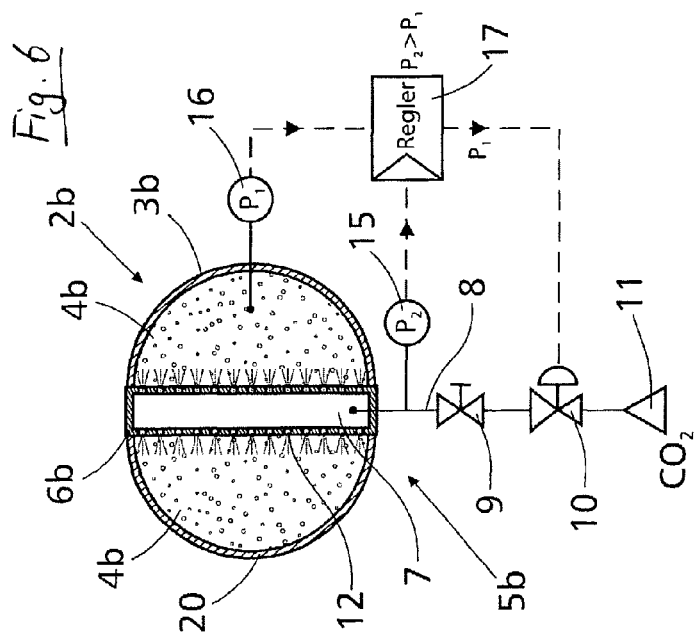
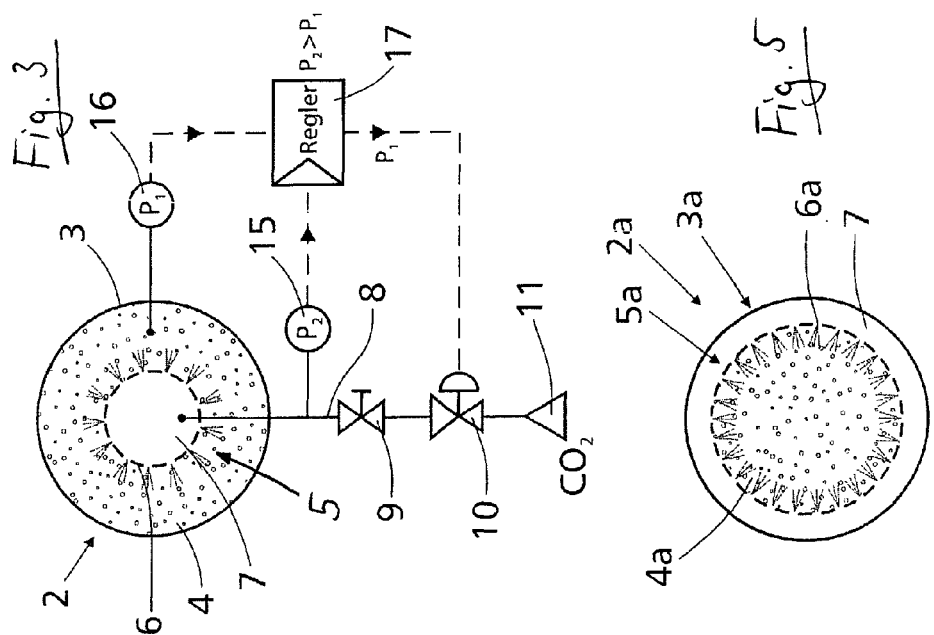

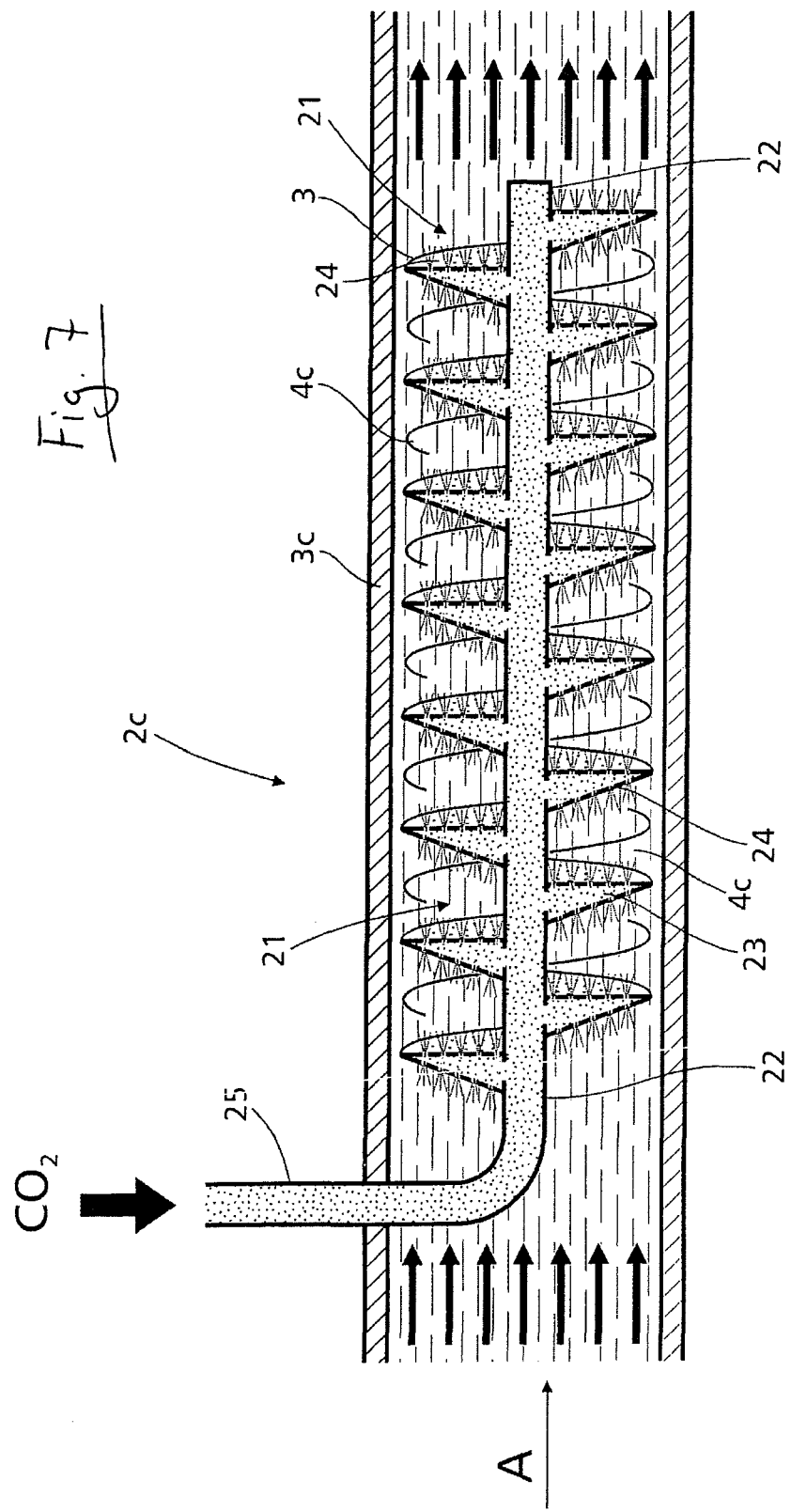

METHOD AND DEVICE FOR CARBONATING A LIQUID MEDIUM, FOR EXAMPLE A BEVERAGE

CROSS-REFERENCE TO RELATED APPLICATIONS

This application is the National Stage of International Application No. PCT/EP2009/004540, filed on Jun. 24, 2009, which claims the benefit of German Application Serial No. 10 2008 032 369.1, filed on Jul. 10, 2008. The contents of both of the foregoing applications are hereby incorporated by reference in their entirety.

The invention relates to a method according to the preamble of claim 1 and to a device for accomplishing the method according to the preamble of claim 8.

Methods and devices for carbonating liquid media, in particular beverages, are known. In the case of the conventional methods used today, the carbonating is effected, as a rule, by means of the most varied types of injection nozzles, by means of which $CO_2$ is introduced into the liquid medium, for example a beverage, that is traversing a carbonating section. This known method is problematic with ever increasing $CO_2$ content and ever increasing outputs or through rates being required (amount of carbonated medium per unit time). Thus, for example, with the carbonation of beverages, a quite considerable portion of $CO_2$, for example 10 g or more per litre is to be introduced into the beverage in the shortest possible time, with high throughputs or volume flows of up to 75 m³/h. In many cases this is not achievable using the known methods, in particular there is also insufficient stable bonding of the carbon dioxide gas in the beverage.

It is the object of the invention to provide a method, which avoids the aforementioned disadvantages and enables the liquid medium, in particular beverages, to be carbonated, even where there is a high $CO_2$ content, providing sufficiently stable bonding of the carbon dioxide gas in the liquid medium. This object is achieved by a method corresponding to claim 1. A device for accomplishing the method is the object of claim 8.

In the case of the method according to the invention, the introducing of $CO_2$ into the liquid medium is effected by means of a plurality of nozzle or discharge openings, which are provided along at least one fairly long carbonating section or at least one fairly long treatment chamber or channel traversed by the medium to be carbonated, said chamber or channel being formed, for example, by a pipe line or a pipe section. The $CO_2$ concentration in the liquid medium increases with this treatment proportionately to the length of the carbonation section or of the at least one treatment channel. By using a plurality of nozzle or outlet openings for the $CO_2$ and by distributing said openings along the treatment channel, sufficient contact surfaces are created between the CO and the liquid medium. The same is achieved when using at least one fairly long slot-type nozzle or outlet opening that extends in the direction of the treatment channel.

In the case of a preferred embodiment of the invention, means are provided in order to improve the $CO_2$ or carbon dioxide bonding in the medium by means of turbulence or by means of flow turbulence in the liquid medium. Said means are formed, for example, by a pump provided at the outlet of the at least one carbonating section, for example a booster pump, and/or by a mixing device and/or in that a baffle giving rise to flow turbulence in the liquid medium is provided in the region of the treatment channel, said baffle preferably being at the same time also the nozzle unit for discharging the $CO_2$.

Further developments, advantages and applications of the invention are produced from the following description of exemplary embodiments and from the Figures. In this case, all features described and/or graphically represented are objects of the invention, either individually or combined, irrespective of their summary in the claims or their dependency. The content of the claims is also made a component of the description.

The invention is described below by way of the Figure of exemplary embodiments, in which, in detail:

FIG. 1 shows a schematic functional representation of a carbonating device according to the invention;

FIG. 2 shows a longitudinal section through the carbonating section of the carbonating device in FIG. 1;

FIG. 3 shows a cross section through the carbonating section of the carbonating device in FIG. 1;

FIG. 4 shows a graphic representation of the increase in $CO_2$ content in the liquid along the carbonation section;

FIGS. 5 and 6 show cross sections of the carbonation section in additional embodiments of the invention;

FIG. 7 shows a simplified schematic representation of a longitudinal section through the carbonation section in the case of a preferred embodiment of the device according to the invention.

The carbonation device given the general reference 1 in FIG. 1 is used to carbonate a liquid medium, i.e. to introduce $CO_2$ or carbon dioxide gas into the liquid medium, e.g. into a beverage.

The device 1 comprises a carbonation section 2, which is formed, for its part, by a housing 3, which is tubular in the embodiment represented, with a treatment channel 4 that is traversable by the liquid medium and extends over the entire length of the housing 3.

A nozzle unit 5 is provided inside the housing 3 along the treatment channel 4, said nozzle unit, in the embodiment represented, comprising a nozzle housing 6 with a circular cylindrical circumferential wall, said nozzle housing being closed at both ends and located on the identical axis as the longitudinal axis L of the tubular housing 3. The interior 7 of the nozzle housing 6 is connected by means of a line 8, in which a non-return valve 9 and a control valve 10 are provided, to a source 11 for a pressurized $CO_2$ gas or to a line leading to said $CO_2$ gas.

The outside diameter of the nozzle housing 6 is smaller than the inside diameter of the housing 3 such that the treatment channel 4 is a ring-shaped channel formed between the nozzle housing 6 and the inside face of the housing 3, the axial length of which channel being considerably greater than the cross section of the housing 3.

The nozzle housing 6 is provided on the circumferential face over its entire length and over its entire circumferential extent with a plurality of openings 12, for the outlet of $CO_2$ into the treatment channel 4.

The references 13 and 14 in FIG. 1 are given to two pumps, via which the liquid medium to be carbonated (e.g. beverage) is supplied to the carbonation section 2 or to its inlet 2.1 (pump 13) or via which the carbonated medium, i.e. the medium charged with carbon dioxide gas, is supplied from the carbonation section 2 or from its outlet 2.2 to another use (pump 14), for example to a filling machine (not shown). In order to avoid an ingress of liquid medium into the interior 7 of the nozzle housing 6 and in particular also to enable the discharging of $CO_2$ via the nozzle openings 12 into the liquid medium traversing the treatment channel 4, the pressure P1 of the $CO_2$ gas in the interior 7 is set such that it is greater than the pressure P2 of the liquid medium in the treatment channel 4. In order to maintain these pressure conditions, corresponding to FIG. 3, a sensor 15 measuring the pressure P1 is provided in the line 8. In addition, a sensor 16 measuring the pressure P2 of the liquid medium is provided in the treatment channel 4. The measuring signals of the two sensors 15 and 16 are compared in a regulating means 17, which controls the control valve 10 in such a manner that the pressure P1 is always greater than the pressure P2.

In addition, it is possible to control the volume flow of the CO2 gas supplied to the nozzle housing 6 in dependence on the volume flow of the liquid medium traversing the treatment channel, in order, in this manner, to achieve a desired CO2 concentration in the carbonated liquid medium. To this end, corresponding to FIG. 1, provided in the line 8 is a sensor 18 measuring the volume flow of the CO2 gas and in the treatment channel 4 a sensor 19 measuring the volume flow of the liquid medium. The two sensors 18 and 19 are, in their turn, connected to the regulating means 17, which controls the control valve 10 additionally having regard to the sensor signals of the sensors 18 and 19, preferably also in dependence on further control parameters or settings, for example in dependence on the desired carbonation rate or the desired CO2 content and possibly in dependence on additional parameters, such as, for example, the temperature of the liquid medium, etc.

The regulating means 17 is, for example, a control unit supported, for example, by a microprocessor or is a component of a control device or a computer for controlling an installation that includes the device 1. The regulating means 17 can obviously also be realized entirely or partially by software in a control unit or in a computer.

The advantage of the device 1 or of the carbonation section 2 is that the introducing of the CO2 gas into the liquid medium is effected over a relatively long treatment section 4 and consequently, in particular where the device 1 has high outputs, i.e. a high throughput of the liquid medium through the device 1 per unit time, a uniform addition of CO2 into the liquid medium is achieved with stable CO2 bonding in the liquid medium. This also prevents or greatly reduces CO2 escaping from the liquid medium in an unwanted manner in a further treatment, in particular during the filling process, such that, for example, higher outputs are possible when filling the carbonated medium.

The addition of the CO2 gas is effected at a pressure P1, which is clearly above the respective saturation pressure. By means of the pump 14, connected downstream and serving as a booster pump, the CO2 bonding in the liquid medium is improved even more on account of the flow turbulence occurring in said pump.

As shown in FIG. 4, the CO2 concentration $K_{CO2}$ increases in the liquid medium proportionately to the length I of the carbonation section or of the at least one treatment channel.

FIGS. 5 and 6 show further possible embodiments of the carbonating section 2a or 2b. In the case of the embodiment in FIG. 5, the carbonating section 2a, corresponding to the carbonating section 2, is realized such that the treatment channel 4a, corresponding to the treatment channel 4, is situated within the nozzle device 5a, i.e. the nozzle device 5a, with its ring-shaped nozzle housing 6a, surrounds the treatment channel 4a and is provided on its wall surrounding said treatment channel with a plurality of nozzle openings 12.

In the case of the embodiment in FIG. 6, the carbonation section 2b comprises a nozzle device 5b with a nozzle housing 6b, which is rectangular in cross section and is provided in the cross sectional sides with the greater width with the plurality of openings 12. Treatment channels 4b are formed on both sides of the housing 6b connecting to the cross sectional sides with the greater width, said treatment channels being defined in each case by arcuate wall sections 20 that are connected in a sealing manner to the nozzle housing 6b. The nozzle housing 6b is, once again, closed at both ends and is connected to the line 8 for supplying the CO2 gas. The non-return valve 9 and the control valve 10 as well as the pressure sensor 15 are provided in the line. The pressure sensor 16 is located in at least one treatment channel 4b. In addition, the regulating means 17 is represented in FIG. 6, by way of which regulating means the control valve 10 is actuated as a function of the sensor signals of the pressure sensors 15 and 16.

It is obvious that also in the case of carbonating sections 2a and 2b, the respective nozzle device 5a or 5b extends over the entire length of the treatment channel 4a or of the treatment channels 4b, the length of the treatment channels 4a and 4b being clearly greater than the cross section of said channels.

FIG. 7 shows a longitudinal section of a carbonating section 2c, where a baffle 21 for the liquid medium in the form of a screw-like or helix-like hollow body is located inside the tubular housing 3c that defines the treatment channel 4c. The baffle 21 comprises, for this purpose, a pipe section 22, which is located on the identical axis as the longitudinal axis L of the housing 3c, and a helix 23, which protrudes beyond the outside face of the pipe section 22, is realized as a hollow body and is provided on its surfaces with a plurality of nozzle or outlet openings 24. The pipe section 22 is sealingly closed at one end. At the other end, the pipe section 22 is guided in a sealing manner out of the tubular housing 3c by way of a curved portion 25 and is connected, for example, to the line 8 for supplying pressurized CO2. The diameter of the baffle 21 or of the helix 23 is approximately identical to the inside diameter of the housing 3c, such that the liquid medium traversing the carbonation section 2c or the housing 3c, inside the helical baffle 21, traverses said baffle on a helical flow path surrounding the longitudinal axis L of the pipe section 22 or the treatment channel 4c and at the same time the CO2 emerging from the openings 24 is bonded into the liquid medium.

Particular advantages of the carbonation section 2c are, among other things, that, in spite of a compact embodiment of the carbonation section 2c, a relatively long treatment channel 4c is produced by means of the helical flow path. In addition, considerable flow turbulence is generated inside the liquid medium by the baffles 21 and this turbulence improves the mixing and bonding of CO2 into the liquid medium in a considerable manner, in particular it also results in a uniform, stable bonding of CO2 in the liquid medium, such that a releasing of CO2 especially also during a subsequent treatment of the carbonated medium, for example, when filling said medium into bottles or similar containers, is prevented or at least considerably reduced.

The invention has been described above by way of exemplary embodiments. It is obvious that changes and conversions are possible without in any way departing from the inventive concept underlying the invention.

LIST OF REFERENCES

1 Carbonating device
2, 2a-2c Carbonating section
3, 3a-3c Housing
4, 4a-4c Treatment channel
5, 5a, 5b Nozzle device
6, 6a, 6b Nozzle housing
7 Interior
8 Line
9 Non return valve
10 Control valve
11 CO2 source 12 Discharge or nozzle opening
13, 14 Pump
15, 16 Pressure sensor
17 Regulating means
18, 19 Sensor
20 Wall
21 Baffle
22 Pipe section
23 Helix
24 Discharge or nozzle opening
25 Portion
A Direction of flow of the liquid medium, for example beverage
L Longitudinal axis
I Length
$K_{CO2}$ CO2 concentration Translation of Words on the Figures
FIG. 3

| German | English |
| --- | --- |
| Regler | Regulating means |

FIG. 6

| German | English |
| --- | --- |
| Regler | Regulating means |

The invention claimed is:

1. A method for carbonating a liquid medium, said method comprising introducing pressurized CO2 into the liquid medium by using at least one nozzle device provided in a housing that is traversed by the liquid medium said nozzle device selected from a group consisting of a nozzle device having a plurality of nozzle or outlet openings said nozzle or outlet openings being distributed along at least one treatment channel traversed by the liquid medium, and a nozzle device having at least one slot-type nozzle, which extends along the at least one treatment channel, wherein introducing pressurized CO2 comprises introducing said CO2 in the region of a baffle, located in a carbonating section and traversed by the liquid medium.

2. The method of claim 1, wherein introducing pressurized CO2 is effected via nozzles or discharge distributed over a length of a carbonating section or of the treatment channel, said length being greater than the maximum cross sectional flow of the treatment channel in the region of the nozzle or discharge openings.

3. The method of claim 1, wherein introducing pressurized CO2 is effected by at least one slot-type nozzle, which extends over a length of a carbonating section or of the treatment channel, said length being greater than the maximum cross sectional flow of the treatment channel in the region of the nozzle or discharge openings.

4. The method of claim 1, wherein introducing pressurized CO2 comprises introducing said CO2 into the liquid medium radially or substantially radially in relation to the direction of flow or to a longitudinal extension of the treatment channel.

5. The method of claim 1, further comprising controlling CO2 pressure in the nozzle device based at least in part on the pressure of the liquid medium, such that the CO2 pressure is at least equal to a pressure of the liquid medium.

6. The method of claim 1, further comprising controlling a volume flow of the CO2 supplied to the nozzle device based at least in part on volume flow of the liquid medium traversing a carbonating section or the at least one treatment channel.

7. The method of claim 1, wherein introducing said CO2 in the region of a baffle comprises introducing said CO2 in the region of a helical baffle.

8. An apparatus for carbonating a liquid medium, said device having at least one nozzle device provided in a housing traversed by the liquid medium for introducing pressurized CO2 into the liquid medium, wherein the nozzle device has a plurality of nozzle or outlet openings and/or at least one slot-type nozzle for introducing CO2 into the liquid medium, and wherein the nozzle or outlet openings are distributed along at least one treatment channel traversed by the liquid medium and/or the at least one slot-type nozzle that extends along the at least one treatment channel, wherein the nozzle or discharge openings and/or the at least one slot-type nozzle are provided in a region of at least one baffle that is located in a carbonating section and that is traversed by the liquid medium.

9. The apparatus of claim 8, wherein the nozzle or discharge openings are distributed over a length of a carbonating section or of the treatment channel, said length being greater than a maximum lineal dimension of a cross section of the treatment channel in the region of the nozzle device.

10. The apparatus of claim 8, wherein the at least one slot-type nozzle extends over a length of a carbonating section or of the treatment channel, said length being greater than a maximum lineal dimension of a cross sectional flow of the treatment channel in the region of the nozzle device.

11. The apparatus of claim 8, wherein the nozzle or discharge openings and/or the at least one slot-type nozzle for introducing CO2 into the liquid medium are oriented radially or substantially radially in relation to a direction of flow or to a longitudinal extension of the treatment channel.

12. The apparatus of claim 8, wherein the baffle is the at least one nozzle device.

13. The apparatus of claim 9, wherein said length is a multiple of said maximum lineal dimension of said cross section.

14. The apparatus of claim 10, wherein said length is a multiple of said maximum lineal dimension of said cross section.

15. The apparatus of claim 8, wherein said baffle is a helical baffle.

* * * * *